Nov. 7, 1967 P. B. MASON 3,350,993
PHOTOGRAPHIC APPARATUS FOR TREATING LIGHT-SENSITIVE
MATERIALS WITH A LIQUID
Filed April 30, 1965 3 Sheets-Sheet 2
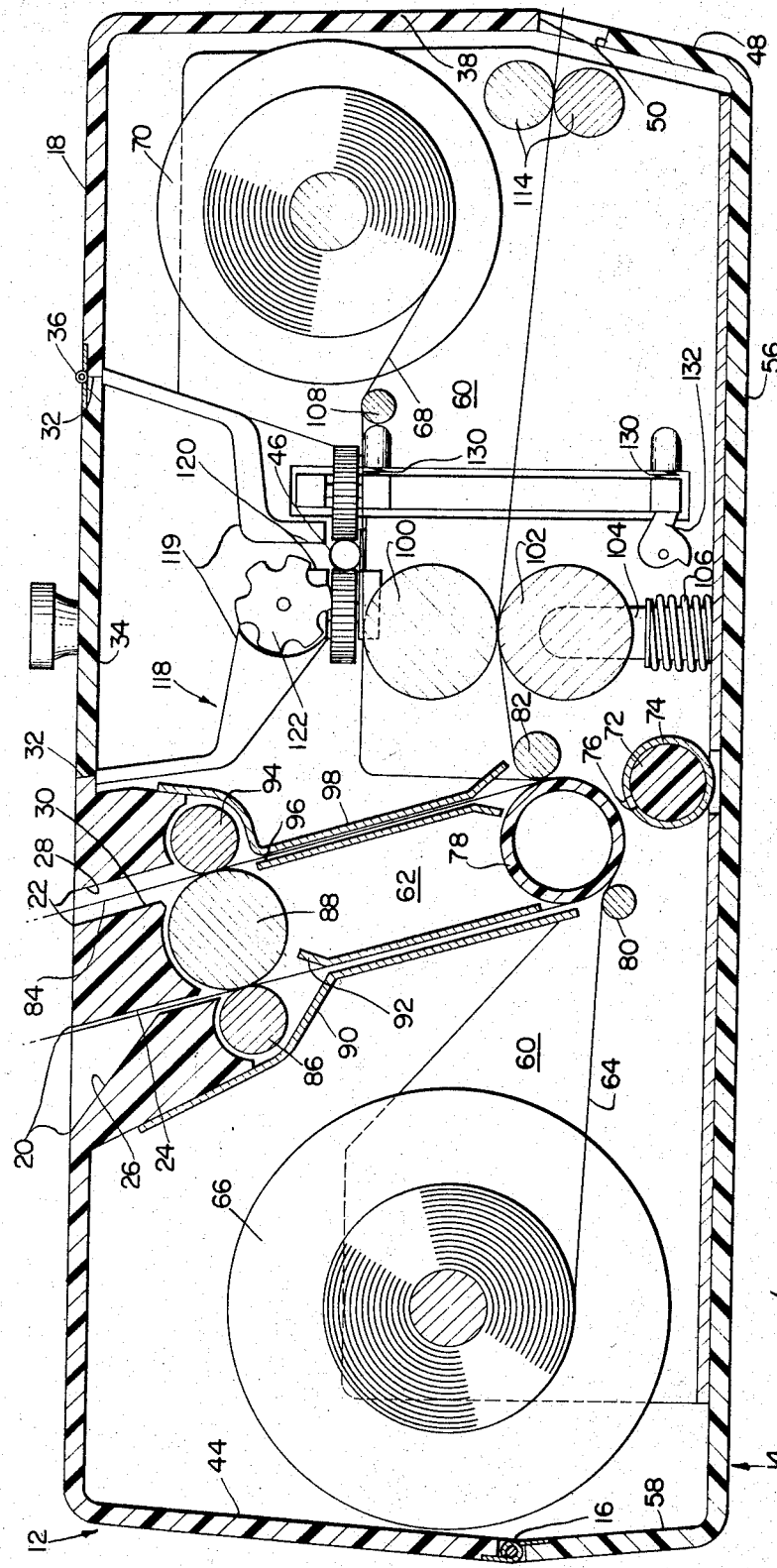
INVENTOR.
Paul B. Mason
BY
Brown and Mikulka
and
Robert E. Corb
ATTORNEYS INVENTOR.
Paul B. Mason
BY
Brown and Mikulka
Robert E. Corb
ATTORNEYS

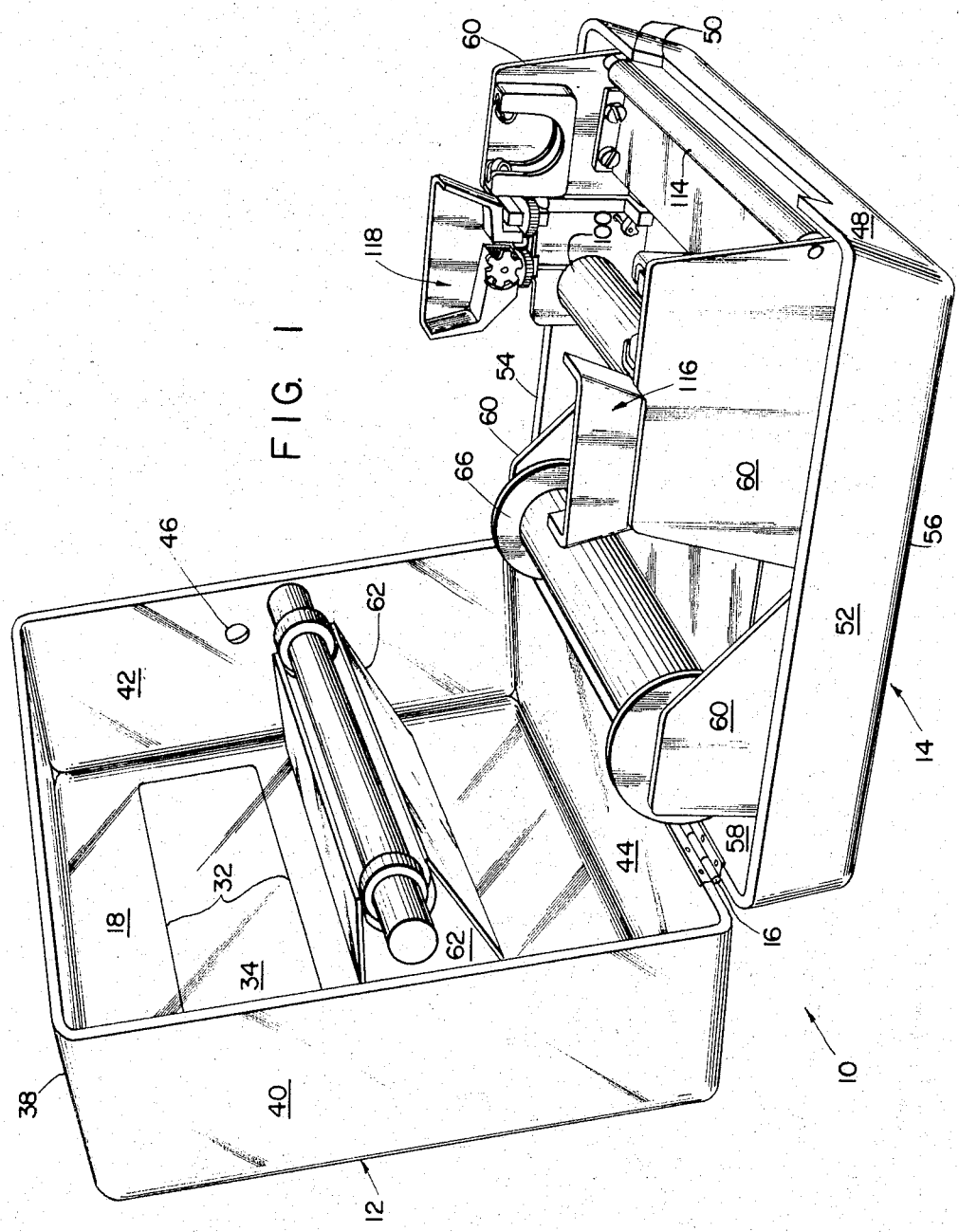

United States Patent Office 3,350,993
Patented Nov. 7, 1967

3,350,993
PHOTOGRAPHIC APPARATUS FOR TREATING LIGHT-SENSITIVE MATERIALS WITH A LIQUID
Paul B. Mason, Magnolia, Mass., assignor to Polaroid Corporation, Cambridge, Mass., a corporation of Delaware
Filed Apr. 30, 1965, Ser. No. 452,280
19 Claims. (Cl. 95—89)

ABSTRACT OF THE DISCLOSURE

A photographic copying apparatus is disclosed having a source of illumination for exposing a photosensitive sheet during movement of the sheet relative to said source of illumination. Structure is provided for automatically moving individual containers of a processing medium from a storage area to a position adjacent the sheet and thereafter dispensing the processing medium from the container while the container is transversely moved relative to the sheet and compressed.

---

This invention relates to photography and more particularly to photographic apparatus for exposing a portion of a photographic sheet and treating the exposed area by superposing the exposed area with a second sheet and distributing a processing liquid over and in contact with the sheets.

The invention is shown incorporated in a device for making copies of original documents and in which the processing liquid is initially contained in an elongated tubular container and is discharged from the container onto one of the sheets by progressively compressing a portion of the container to eject the liquid at an end of the container. Features common to document copiers of this type include means for feeding an original document into the apparatus and superposing it with an image-recording sheet during the exposure thereof, exposing the image-recording sheet, separating the original from the image-recording sheet, superposing the image-recording sheet on the second sheet, introducing the processing liquid between the two sheets, and advancing the superposed sheets between a pair of juxtaposed members to distribute the processing liquid between the sheets.

An object of the present invention is to provide novel and improved apparatus for advancing a tubular container of processing liquid positioned adjacent and transverse a photographic sheet lengthwise relative to the sheet to locate an end of the container in relation to the sheet, and further advancing and progressively compressing the container to discharge a predetermined quantity of the processing liquid from the end of the container onto the adjacent sheet as an elongated, uniformly distributed mass.

Another object is to provide novel apparatus of the type mentioned which includes means for advancing the tubular container completely from the housing of the apparatus after the desired amount of processing liquid has been discharged therefrom.

Still another object is to provide a novel device of the type previously mentioned which includes means for advancing a container of processing liquid from a storage position among a plurality of containers into position adjacent and transverse the photographic sheet.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view of components of document copying apparatus embodying one form of the present invention shown with the housing of the apparatus open in an inoperative position;

FIG. 2 is a sectional view of the apparatus of FIG. 1, the section being taken substantially midway between the sides of the housing with the housing in a closed, operative position;

FIG. 3 is a fragmentary view, partially in section, of a container used for introducing processing fluid into the apparatus.

Figure 4:
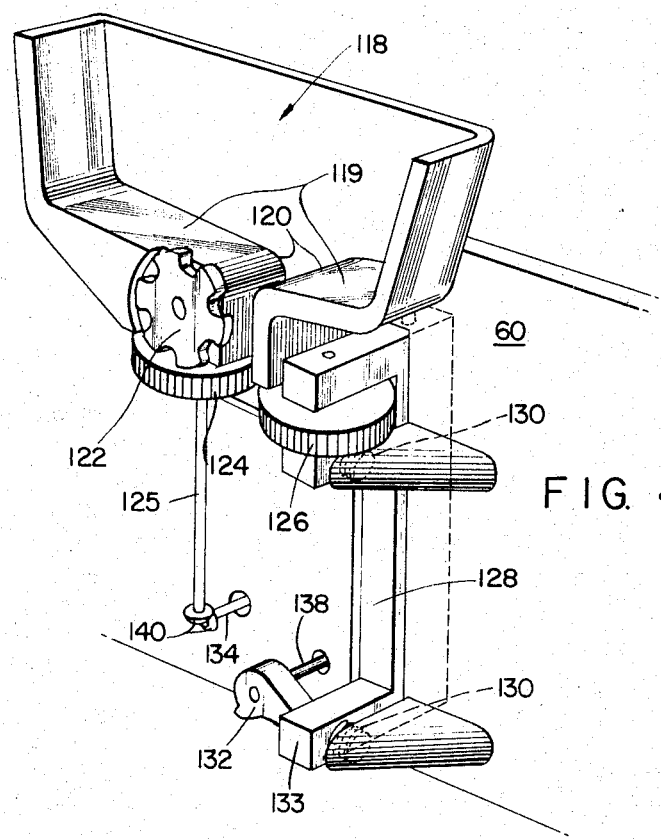
FIGS. 4 and 5 are perspective fragmentary views, partially in section, of apparatus comprising means for locating, compressing and advancing the container of FIG. 3.

Reference is now made to FIGURES 1 and 2 wherein is illustrated one form of document-copying apparatus embodying the invention. Housing 10 mounting and enclosing the operative components comprises an upper housing section 12 pivotably secured to a lower housing section 14 by a hinge 16 located at one end called the rear end of the apparatus. The two sections are pivotable between a closed or operative position, and the open or inoperative position, shown in FIGURE 1, in which the housing sections are separated to permit loading the photographic sheet material into the apparatus.

Upper housing section 12 comprises an upper wall 18 in which are located an inlet passage 20 and exit passage 22 through which the original document to be copied can be introduced into and fed from the apparatus. Inlet passage 20 comprises a pair of convergent walls which may be designated forward wall 24 and rear wall 26. Exit passage 22 similarly comprises a forward wall 28 and rear wall 30. An opening 32 is provided in upper wall 18 adjacent a storage area in which a number of fluid-filled containers may be stored prior to use. A cover 34 for opening 32 is provided pivotably connected to upper wall 18 by hinges 36. Housing section 12 also comprises side walls 40 and 42, designated left and right side walls, respectively, a forward wall 38 and a rear wall 44 to which the upper portion of hinge 16 is connected. Portions of right side wall 42 serve to define a circular opening 46 through which the containers of processing fluid may be advanced lengthwise from the housing.

Lower housing section 14 comprises a forward wall 48, portions of which serve to define withdrawal opening 50, left and right side walls 52 and 54, a bottom wall 56, and a rear wall 58 to which the lower portion of hinge 16 is connected.

The operative components of the document-copying apparatus are mounted on a pair of chassises carried within housing 10 in the upper and lower housing sections, respectively. The lower chassis comprises a pair of side plates 60 securely mounted to and extending upwardly from bottom wall 56. The upper chassis comprises a pair of upper side plates 62 extending downwardly from upper wall 18 in housing section 12 and securely mounted on upper wall 18.

The lower chassis includes means for mounting the image-recording and second sheets used in the apparatus. The image-recording sheet 64, preferably in the form of an elongated strip, is supplied on a conventional spool 66 which is mounted at its ends for rotation between side plates 60 near the rear end of housing 10. The second sheet 68, also in the form of an elongated strip, is provided on a similar spool 70 mounted for rotation between side plates 60 near the forward end of the housing.

The apparatus includes an illumination source for exposing the image-recording sheet in conjunction with the original document and means for conducting the image-recording sheet and original document in superposition past the illumination source. The illumination source comprises a light-conducting cylindrical bar 72 enclosed in an opaque tube 74 which is provided with an axial slot 76 equal in length to the image-recording sheet for transmitting actinic light emitted from bar 72 to the image-recording sheet. The light source for the bar comprises a small incandescent lamp mounted within the end section of tube 74 adjacent to the end of bar 72. The illumination source is mounted in the lower chassis between side plates 60. As the superposed image-recording sheet and original document are guided past the illumination source, the image-recording sheet is subjected to a reflex exposure in which the actinic light is transmitted through the image-recording sheet to the surface of the original document and is partially reflected back to the image-recording sheet to form a developable image therein.

The means for guiding the photosensitive sheet and original document in superposition past the illumination source comprise a cylindrical tube 78 mounted for rotation on upper side plates 62, an elongated guide rod 80 mounted between lower side plates 60 with its axis parallel with the axis of tube 78 and its periphery spaced slightly at a distance from the periphery of tube 78, and a guide roll 82 mounted for rotation in juxtaposition with tube 78 on the opposite side of tube 78 from guide roll 80 with its axis parallel with the axis of tube 78.

The photosensitive sheet is conducted from spool 66, between the guide rod and tube 78, around a portion of the cylindrical surface of tube 78, and between the tube and guide roll 82. Axial slot 76 in tube 74 is positioned so that the actinic light transmitted from bar 72 will expose the portion of the photosensitive sheet which is supported by the cylindrical tube 78 between guide rod 80 and guide roll 82.

The means provided for guiding the original document, designated 84 in FIG. 2, into superposition with the image-recording sheet comprise a pair of rolls, inlet roll 86 and central roll 88, mounted for rotation in juxtaposition adjacent inlet passage 20. Rolls 86 and 88 engage the original document along a line lying in a plane substantially tangent to the surface of tube 78 at a line closely adjacent rod 80 and tube 78 and, in conjunction with a pair of light-sealing elements 90 and 92 which extend, respectively, from rear wall 26 of inlet opening 20 to a point closely adjacent rod 80 and from central rod 88 to a point closely adjacent tube 78, guide the original document between rod 80 and tube 78 and into superposition for exposure with the photosensitive sheet.

The apparatus also includes means for separating original document 84 from the image-recording sheet following the exposure of the latter in superposition with the original document and for then guiding the original out of the apparatus. These means include an outlet roll 94 mounted for rotation between upper side plates 62 parallel and in juxtaposition with the central roll 88 so as to engage the original document along a line lying in a plane substantially tangent to the surface of tube 78 at a line closely adjacent guide roll 82 and tube 78. A pair of light-sealing elements 96 and 98, which extend downwardly from rolls 88 and 94, respectively, to positions closely adjacent tube 78 and roll 82, are provided to assist in separating the original document from the image-recording sheet and guiding the original into the bite of the outlet and central rolls. Elements 90, 92, 96 and 98 also serve to prevent light from entering the apparatus through the inlet and exit passages and fogging or overexposing the image-recording sheet.

After the original document has been separated from the image-recording sheet and guided out of the apparatus, the exposed portion of the image-recording sheet is superposed with the second sheet and a layer of a processing liquid distributed between the sheets to form a copy of the original document on the second sheet. The means provided for distributing the liquid include a pair of pressure-applying rolls 100 and 102. Roll 100 is mounted for rotation on lower side plate 60. Roll 102 is mounted for rotation between a pair of movable members 104 on bottom wall 52. A spring mechanism 106 is provided for biasing roll 102 toward roll 100.

The exposed portion of the image-recording sheet is guided around a portion of guide roll 82 and then between pressure-applying rolls. The second sheet is conducted from spool 70, around guide rod 108 mounted between side plates 60 parallel with spool 70, around a portion of roll 100 and into superposition with the image-recording sheet between rolls 100 and 102. The portion of the second sheet between guide rod 108 and roll 100 provides a substantially horizontal surface adjacent the lower edge of the periphery of circular opening 46 on which the mass of processing fluid may be deposited. Since rolls 66 and 70 are both mounted on lower housing section 14, the image-recording and second sheets may be threaded between the pressure-applying rolls when housing sections 12 and 14 are separated in the inoperative position.

In the apparatus shown the processing liquid is supplied in an elongated tubular container very much like a conventional drinking straw. This container, designated 110 in FIG. 3, includes a cavity of substantially uniform cross section approximately equal in length to the width of the exposed portion of the image-recording sheet and filled with a processing liquid. Both ends of the container are sealed with one end, designated 112 and adapted to become unsealed to form a discharge mouth through which the processing liquid may be discharged in response to a hydraulic pressure generated within the enclosed liquid. In the disclosed apparatus the container is placed transverse the second sheet with end 112 located adjacent the margin of the second sheet most distant from opening 46. The portion of the container adjacent the lateral edge of the second sheet nearest opening 46 is then compressed and the container advanced from the apparatus. The progressive compression of the container during this advancement creates a hydraulic pressure in the enclosed liquid and causes end 112 of the container most distant from opening 46 to become unsealed and the contents to be ejected therefrom in the form of a uniformly elongated mass extending across the substantially horizontal portion of the second sheet between guide rod 108 and pressure-applying roll 100. The means for locating the container adjacent the second sheet and for discharging the liquid from the container will be described in detail hereinafter.

After the processing liquid has been discharged onto the image-receiving sheet, the image-recording and second sheets are advanced in superposition between the pressure-applying rolls to distribute the processing liquid between and in contact with the superposed sheets toward the trailing end of the exposed area of the image-recording sheet and over the exposed area to form a sandwich. The sandwich comprising the superposed sheets is required to remain in darkness during a predetermined period at the end of which it may be guided out of the housing and the sheets separated. A pair of withdrawal rolls 114 are provided mounted in juxtaposition for rotation on lower side plate 60 within housing 10 and adjacent withdrawal opening 50 for advancing the superposed sheets through the housing in a lighttight environment and guiding them from the housing. When the sandwich is advanced out of the apparatus, the processed portions of the superposed sheets may be severed from the unprocessed sheet material and separated; the image-recording sheet being discarded and the second sheet, which comprises a copy of the original document, retained.

In most document copiers heretofore provided in which a processing liquid is discharged from a tubular container onto a photographic sheet, the container is located adjacent and transverse the photographic sheet, the portion of the container adjacent a lateral edge of the sheet compressed, and the container then advanced in the direction of its elongation to discharge the fluid from the container. In most devices, these functions are performed manually; in others, one or more may be performed mechanically. For example, copending application Ser. No. 297,851, filed July 26, 1963, now Patent No. 3,266,405, discloses and claims novel means for advancing a container from a storage area within the housing enclosing the apparatus to a position adjacent and transverse the sheet with an end portion of the container extending through an opening in a side wall of the housing and then compressing the portion of the container adjacent the lateral edge of the sheet nearest the opening. The end portion may then be grasped and the container drawn from the housing to dispense the liquid onto the adjacent sheet.

Figure 5:
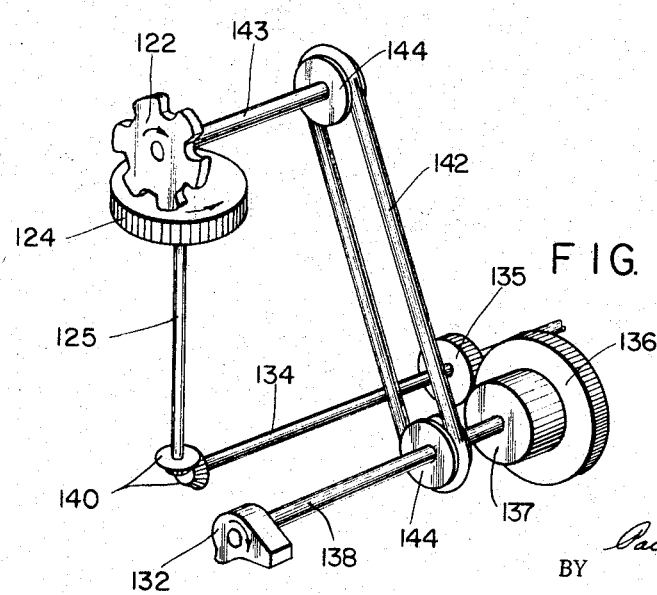

The present invention, illustrated in FIGS. 4 and 5, comprises novel, improved means for locating a tubular container of processing liquid in a position adjacent and transverse the direction of movement of one of the photographic apparatus, advancing the container lengthwise to locate the end through which the enclosed liquid will be dispensed relative to the sheet, compressing a portion of the container adjacent the opposite lateral edge of the sheet, advancing and progressively compressing the container to dispense the enclosed liquid therefrom and releasing the compressive force applied to the container after the desired amount of processing liquid has been deposited on the adjacent sheet. In the illustrated apparatus, in which a plurality of containers are provided in a storage area within the housing and advanced one at a time to a position adjacent the second sheet, the invention includes means for advancing the container completely from the apparatus after the desired amount of liquid has been dispensed therefrom. The invention is shown comprising a pair of cooperating members at least one of which is rotatable in engagement with the container for advancing the container lengthwise, and one of which is movable toward and away from the container for applying the desired compressive force thereto.

The means provided for advancing a container of processing liquid from the storage area into a position closely adjacent and extending transverse the second sheet with end 112 of the container located adjacent the lateral edge of the second sheet most distant from circular opening 46 include a pair of end blocks 116 and 118 mounted on the lower chassis adjacent left and right side walls 52 and 54, respectively. Each end block comprises a substantially U-shaped channel mounted on the interior surface of a side wall 60 with the legs of the U extending vertically upward. The base section of each end block includes surfaces 119 mounted perpendicularly to side walls 60 and inclined downwardly toward the central portion of the end block to form a wide V. End block 116 is mounted on the interior surface of the side plate 60 nearest left side wall 52 with the lowest portion of surfaces 119 lying in substantially the same plane as the second sheet. End plate 118 is mounted on the interior surface of the opposite side wall with the lowest portion of surfaces 119 lying in a plane above the plane of the second sheet. End block 118 includes a vertical slot 120 extending downwardly from surfaces 119 to a point adjacent the image-recording sheet and circular opening 46.

If a number of fluid-filled containers are placed in the storage area, they will be supported by surfaces 119 of end blocks 116 and 118 in a position inclined to the second sheet, end 112 of each container being supported by end block 116 at approximately the same level as the second sheet and the other end of the container being held a distance above the second sheet by end block 118. The means provided for advancing the end portions of the containers supported by end block 118 into position adjacent the second sheet at the bottom of slot 120 comprises a toothed rubber wheel 122 mounted for rotation on the interior vertical surface of end block 118 adjacent slot 120. The teeth of wheel 122 are spaced at a distance slightly greater than the diameter of a container of processing liquid. As illustrated in FIG. 4, wheel 122 is designed to engage one of the containers supported by surfaces 119 adjacent slot 120 between a pair of successive teeth and advance the container, in response to the clockwise rotation (viewed in FIG. 4) of the wheel, downward toward the bottom of slot 120. After the container has been advanced approximately half-way down the slot, it is formed out of engagement with wheel 122 by the side wall of slot 120 and drops to the bottom of the slot. The diameter of wheel 122 is such that its continued rotation after a container has been advanced to the bottom of slot 120 will cause the teeth to slip past the containers located in the slot adjacent the wheel without crushing the adjacent containers or compressing the containers located more closely adjacent the second sheet.

As illustrated in FIGS. 4 and 5, the means for advancing the container that has previously been advanced to the bottom of slot 120 lengthwise from its position closely adjacent the second sheet and out of the apparatus through circular opening 46 comprises a pair of gears, 124 and 126, mounted for rotation in a common plane adjacent the opposite sides of slot 120. Gear 124 is mounted for rotation on shaft 125 in end block 118 on the left side (viewing FIG. 4) of slot 120 approximately tangent to the plane including the left side of slot 120. Gear 126 is mounted for rotation in an E-shaped member 128 on the opposite side of slot 120. As shown in FIG. 4, member 128 is pivotably mounted on side plate 60 to provide for limited movement of gear 126 relative to gear 124. A pair of springs 130 are provided for biasing member 128 and hence gear 126 towards gear 124, and a cam 132 is provided engaging a leg 133 of member 128 for controlling the position of member 128 and gear 126 relative to gear 124.

As cam 132 is rotated, member 128 and gear 126 are moved between three positions relative to gear 124. In the first position, shown in FIGS. 2 and 4, member 128 is spaced away from slot 120 so that the distance between the adjacent peripheral portions of gears 124 and 126 is greater than the diameter of a fluid-filled container; in the second position, member 128 has moved toward slot 120 so that the distance between the gears is slightly less than the diameter of a container; and in the third position, member 128 has been moved farther toward slot 120 so that the container is compressively engaged between gears 124 and 126. The thickness of the teeth on each of the gears is substantially less than the space between successive teeth so that the gears will be in positive engagement when member 128 is in the third position.

A motor (not shown) is provided within lower housing section 14 adjacent right side wall 54 for rotating toothed wheel 122 and gears 124 and 126 to advance the containers of processing liquid from the storage area into position adjacent the second sheet and then in an axial direction from this position and out of the apparatus. The means for rotating wheel 122 and gears 124 and 126 is illustrated in FIG. 5. The motor drives a shaft 134 mounted parallel with the pressure-applying rolls and extending from the motor to a point closely adjacent the rear side wall 60. A pair of bevel gears 140 are provided to connect shaft 134 and shaft 125 on which gear 124 is mounted so that gear 124 will rotate in a counterclockwise direction (viewed from above) whenever the motor is operating. The motor also drives a second shaft 138, mounted parallel with shaft 134 and on which cam 132 is mounted, through a pair of gears 135 and 136 mounted on shafts 134 and 138, respectively. Gear 136 is mounted on shaft 138 in engagement with gear 135 for rotation relative to shaft 138. A clutch 137 is provided on shaft 138 for movement into and from engagement with gear 136 so that shaft 138 will rotate in response to the rotation of gears 135 and 136 only when clutch 137 is engaged with gear 136. A rubber belt 142 is provided connecting a pair of wheels 144 mounted on shaft 138 and shaft 143 on which toothed wheel 122 is mounted for rotating the toothed wheel in response to the rotation of shaft 138.

Even though gear 124 is rotated at all times the motor is operating, it should be evident that a container of processing liquid that is located at the bottom of slot 120 will not be advanced from its position adjacent the second sheet when member 128 is in the first position in which the container is not forced into engagement with the rotating gear. To move member 128 into the second or third positions in which the container is engaged by and between the gears, it is necessary to move clutch 137 into engagement with gear 136 and rotate cam 132. As cam 132 rotates (in a clockwise direction as viewed in FIG. 5), it first allows member 128 to move into the second position in which a container located at the bottom of slot 120 is frictionally engaged between the two gears 124 and 126. When member 128 is in the second position, the rotating gear 124 will move the container of processing liquid lengthwise from its position adjacent the second sheet and through opening 46. The distance between gears 124 and 126 in the second position is such that the container is not compressed by the two gears. As cam 132 further rotates, member 128 moves into the third position in which the container is compressively engaged between gears 124 and 126. The distance which the container has been advanced by gear 124 before member 128 is moved into the third position is dependent on the relative diameters of gears 124, 135 and 136 and on the configuration of cam 132. In the present apparatus, these members are designed to advance the container from its original position until the end of the container that was originally supported in end block 116 is located adjacent the portion of the second sheet that will be superposed with the lateral edge of the exposed area of the image-recording sheet most distant from the circular opening before member 128 moves into the third position.

When member 128 is in the third position, rotating gear 124 advances and progressively compresses the container and causes the liquid to be ejected from end 112 of the container and deposited on the second sheet. After a predetermined portion of the container has been progressively compressed, cam 132 forces member 128 back into the second position to allow gear 124 to advance the container completely from the apparatus without dispensing any more liquid onto the sheet. After the container has been ejected completely from the housing, cam 132 forces member 128 back into the first position shown in FIG. 5. Clutch 137 is designed to disengage itself from gear 136 after one complete revolution so cam 132 is not further rotated.

As illustrated in FIG. 5, toothed wheel 122 makes approximately one revolution during each revolution of cam 132, thereby insuring that a container of processing liquid is advanced into slot 120 where it will drop to the bottom of the slot as soon as the previous container is completely advanced from the apparatus.

In most document copiers of the type with which the present invention is concerned, a solenoid is provided for advancing clutch 137 into engagement with gear 136 to initiate movement of cam 132 to advance the container located at the bottom of the slot from the apparatus. The solenoid may be actuated by a switch or button located on housing 10 and operated by the person using the apparatus, by a sensing device located in the inlet or exit passage and responsive to the passing of an edge portion of the original document, or by a number of equivalent means.

In the disclosed apparatus, the means for advancing the containers lengthwise and for progressively compressing the containers during their advancement has been described with reference to and in combination with apparatus in which a plurality of straw-like containers are advanced, one at a time, in a direction substantially perpendicular to their axes from a storage area into a position adjacent one of the photographic sheets. It should be evident, however, that the invention is suitable for use in any photographic apparatus in which a fluid-filled container is advanced in an axial direction and is progressively compressed during at least a part of its axial advancement.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including means for dispensing a quantity of processing liquid from each of a plurality of elongated containers onto an exposed section of a photographic sheet within said apparatus comprising, in combination:

first and second members mounted for rotation adjacent each other and a lateral edge of said sheet within said apparatus, one of said members being mounted for rotation in position for engaging said container adjacent said lateral edge and the other of said members being mounted for movement toward and away from said one member between a first position in which the distance between said members is greater than the thickness of said container, a second position in which said distance is substantially equal to said thickness and said members frictionally engage said container and a third position in which said distance is significantly less than said thickness and said members compressively engage said container;

guide means for locating each of a plurality of said containers adjacent and transverse said photographic sheet within said apparatus and with an end section of said container positioned between said members; and means for moving said other member toward and away from said one member and for rotating one of said members in engagement with said container to advance said container lengthwise relative to said sheet and to progressively compress said container to dispense a quantity of said liquid onto said sheet as a uniformly distributed mass.

2. In photographic apparatus including means for locating an elongated tubular container of processing liquid adjacent and transverse a photographic sheet within said apparatus, in combination: first and second members mounted within said apparatus on opposite sides of said container and adjacent a lateral edge of said sheet, one of said members being mounted for rotation in position for engaging said container adjacent said lateral edge and one of said members being mounted for movement toward and away from the other of said members between a first position in which the distance between said members is greater than the diameter of said container, a second position in which said distance is substantially equal to said diameter and said members engage said container and a third position in which said distance is significantly less than said diameter and said members compressively engage said container; and means for moving one of said members toward and away from the other of said members and for rotating one of said members in engagement with said container to advance said container lengthwise relative to said sheet and to progressively compress said container to dispense a quantity of said liquid onto said sheet as a uniformly distributed mass; said means for moving include means responsive to the rotation of one of said members for moving a given one of said members from said first position to said second and third positions to advance said container lengthwise and to progressively compress a predetermined portion of said container, and to advance said given one member from said third position subsequent to the progressive compression of said predetermined portion.

3. The apparatus of claim 2 in which said last-mentioned means move said given one member from said first position to said second position to advance said container a predetermined distance lengthwise and from said second position to said third position subsequent to the advancement of said container said predetermined distance.

4. The apparatus of claim 2 in which said members advance said container lengthwise from said apparatus through an opening in a housing enclosing said apparatus and in which said last-mentioned means move said given one member from said third position to said second position to advance said container lengthwise from said apparatus subsequent to the progressive compression of said predetermined portion and from said second position to said first position subsequent to the advancement of said container from said apparatus.

5. The apparatus of claim 2 in which said first-mentioned one of said members comprises a friction wheel mounted for rotation about an axis perpendicular to said container.

6. The apparatus of claim 2 in which said members comprise friction wheels mounted for rotation about parallel axes perpendicular to the axis of said container.

7. The apparatus of claim 6 in which said friction wheels are spur gears having a thickness substantially equal to one-half the circumference of said container and the space between successive teeth on each of said gears is substantially equal to the circular thickness of one of said teeth plus twice the wall thickness of said container.

8. In photographic apparatus including means for locating an elongated tubular container of processing liquid adjacent and transverse a photographic sheet within said apparatus, in combination: first and second members mounted within said apparatus adjacent a lateral edge of said sheet on opposite sides of and in engagement with said container adjacent said lateral edge for advancing said container lengthwise and for progressively compressing said container to dispense a quantity of said liquid onto said sheet as a uniformly distributed mass, one of said members being mounted for movement toward and away from the other of said members between a first position in which the distance between said members is substantially equal to the diameter of said container and said members engage said container and a second position in which said distance is significantly less than said diameter and said members compressively engage said container, and one of said members being rotatable in engagement with said container; and means for moving one of said members toward and away from the other of said members and for rotating one of said members in engagement with said container to advance said container lengthwise and to progressively compress said container; said means for moving include means responsive to the rotation of one of said members for moving a given one of said members from said first position to said second position to compressively engage said container subsequent to the advancement of said container a predetermined distance lengthwise, and from said second position to said first position subsequent to the progressive compression of a predetermined portion of said container.

9. The apparatus of claim 8 in which said members comprise friction wheels mounted for rotation about parallel axes perpendicular to said container.

10. In photographic apparatus including means for locating an elongated tubular container of processing liquid adjacent and transverse a photographic sheet within said apparatus, in combination: first and second members mounted within said apparatus adjacent a lateral edge of said sheet on opposite sides of and in engagement with said container adjacent said lateral edge for advancing said container lengthwise and for progressively compressing said container to dispense a quantity of said liquid onto said sheet as a uniformly distributed mass, one of said members being mounted for movement toward and away from the other of said members between a first position in which the distance between said members is substantially equal to the diameter of said container and said members engage said container and a second position in which said distance is significantly less than said diameter and said members compressively engage said container, and one of said members being rotatable in engagement with said container; and means for moving one of said members toward and away from the other of said members and for rotating one of said members in engagement with said container to advance said container lengthwise and to progressively compress said container; said members comprise spur gears mounted for rotation about parallel axes perpendicular to said container; said spur gears having a thickness substantially equal to one-half the circumference of said container and the space between successive teeth on each of said gears is substantially equal to the circular thickness of one of said teeth plus twice the wall thickness of said container.

11. In photographic apparatus for treating a succession of areas of a photographic sheet by distributing a processing liquid in contact with said areas during movement of said sheet through said apparatus, in combination:
an opening in a housing enclosing said apparatus for admitting an elongated tubular container lengthwise;
storage means within said housing for holding a plurality of said containers each containing a quantity of said liquid;
first means for moving one of said containers from said storage means and locating said one container adjacent a transverse edge of one of said areas with said one container extending transversely of the direction of movement of said sheet with an end portion of said one container closely adjacent said opening;
first and second members mounted within said housing on opposite sides of said end portion and adjacent the lateral edge of said sheet nearest said opening, one of said members being mounted for rotation in position for engaging said end portion and one of said members being mounted for movement toward and away from the other of said members between a first position in which the distance between said members is greater than the diameter of said one container and a second position in which said distance is significantly less than said diameter and said members compressively engage said container; and
drive means for actuating said first means to advance said one container from said storage means, for moving a given one of said members from said first position to said second position subsequent to the advancement of said one container by said first means, and for rotating one of said members in engagement with said one container to progressively compress said one container.

12. The apparatus of claim 11 in which said drive means are responsive to the rotation of said last-mentioned one of said members and move said given one member from said second position to said first position subsequent to the progressive compression of a predetermined portion of said container.

13. The apparatus of claim 12 in which said members comprise friction wheels mounted for rotation about parallel axes perpendicular to said one container.

14. The apparatus of claim 11 in which said given one member is mounted for movement between said first position, said second position, and a third position in which said distance between said members is substantially equal to said diameter of said one container, and in which said drive means are responsive to the rotation of one of said members and move said given one member from said first position to said third position subsequent to the advancement of said one container by said first means, from said third position to said second position subsequent to the advancement of said one container a predetermined distance lengthwise, and from said second position subsequent to the progressive compression of a predetermined portion of said one container.

15. The apparatus of claim 14 in which said drive means move said given one member from said second position to said third position subsequent to the progressive compression of said predetermined portion and from said third position to said first position subsequent to the advancement of said one container lengthwise from said apparatus through said opening.

16. The apparatus of claim 14 in which said members comprise friction wheels mounted for rotation about parallel axes perpendicular to said one container.

17. The apparatus of claim 16 in which said friction wheels are spur gears having a thickness substantially equal to one-half the circumference of said one container and the space between successive teeth of each of said gears is substantially equal to the tooth thickness of the other of said gears plus twice the wall thickness of said one container.

18. In photographic apparatus including means for locating an elongated tubular container of processing liquid adjacent and transverse a photographic sheet within said apparatus, in combination: a pair of members mounted within said apparatus on opposite sides of said container and adjacent a lateral edge of said sheet, one of said members being mounted for rotation in position for engaging said container adjacent said lateral edge and one of said members being mounted for movement toward and away from the other of said members between a first position in which the distance between said members is greater than the diameter of said container and a second position in which said distance is significantly less than said diameter; and means for moving a given one of said members from said first position to said second position and for rotating said one of said members to progressively compress said container to dispense a quantity of said liquid onto said sheet as a uniformly distributed mass; said last-mentioned means being responsive to said rotation of one of said members to move said given one member from said second position to said first position subsequent to the progressive compression of a predetermined portion of said container.

19. The apparatus of claim 18 in which said members comprise friction wheels having a thickness substantially equal to one-half the diameter of said container mounted for rotation about parallel axes perpendicular to said container.

References Cited

UNITED STATES PATENTS

| | | | |
|---|---|---|---|
| 2,687,827 | 8/1954 | McGilchrist et al. | 222—102 X |
| 2,918,197 | 12/1959 | Ritscher et al. | 221—277 X |
| 3,103,866 | 9/1963 | Budde | 95—89 X |
| 3,134,317 | 5/1964 | Land | 95—89 |
| 3,266,405 | 8/1966 | Sable et al. | 95—89 |

NORTON ANSHER, *Primary Examiner.*

F. L. BRAUN, *Assistant Examiner.*